United States Patent Office 3,746,741
Patented July 17, 1973

3,746,741
PHENOXYACETIC ACID DERIVATIVES
Adolf Hubele, Riehen, Switzerland, assignor to Ciba Limited, Basel, Switzerland
No Drawing. Filed Oct. 27, 1969, Ser. No. 869,913
Claims priority, application Switzerland, Nov. 1, 1969, 16,334/69
Int. Cl. C07c 127/16
U.S. Cl. 260—471 R            5 Claims

ABSTRACT OF THE DISCLOSURE

Derivatives of p-carbamoylamino-phenoxycarboxylic acids such as salts, ester or amides are very effective in plant-influencing, as selective herbicides, defoliants or growth regulators. They may be used in pesticidal preparations.

---

The present invention relates to new carbamoylaminophenoxy compounds, their manufacture and their use as active substances in pesticides.

The present invention provides derivatives of carbamoylaminophenoxycarboxylic acids which correspond to formula

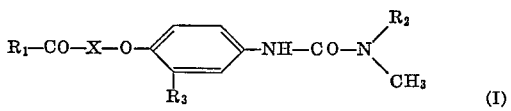

(I)

wherein $R_1$ represents a group

or $R_4$—O—, in which $A_1$ represents a hydrogen atom or an alkyl, alkenyl or alkinyl residue, $A_2$ represents a hydrogen atom, an alkyl, alkenyl, alkinyl or aromatic residue and $R_4$ represents a hydrogen atom, an alkyl residue containing not more than 6 carbon atoms, an aromatic acid residue or a cationic acid residue, $R_2$ represents a hydrogen atom, an $H_3C$— group or a $CH_3O$— group, $R_3$ represents a halogen atom or a lower halogenalkyl group and X represents the —$CH_2$— or —$CH(CH_3)$— group.

The alkyl, alkenyl and alkinyl residues which $A_1$ and $A_2$ may represent contain 1 to 18 or 2 to 18 carbon atoms respectively, preferably however 1 to 4 or 2 to 4 carbon atoms respectively, and can be branched or unbranched, substituted or unsubstituted. The aromatic residue mentioned for $A_2$ and $R_4$ can possess 2 or 3 condensed or non-condensed rings, but is preferably a phenyl nucleus which may be substituted by one or more identical or different halogen atoms, but especially by a chlorine atom. The cationic acid residue mentioned for $R_4$ is a metal atom, preferably an alkali or alkaline earth atom such as, for example, K, Na, Ca or Mg, or an ammonium residue which can be substituted by 1 to 3 lower alkyl or hydroxyalkyl groups having 1 to 4 carbon atoms, such as, for example, methyl, ethyl, propyl, methylol or ethylol residues. The halogen atoms and lower halogenalkyl residues mentioned for $R_3$ have the following meanings: halogen can represent fluorine, bromine or iodine but is preferably a chlorine atom; in the case of lower halogenalkyl residues, the alkyl residues possess 1 to 4 carbon atoms and preferably represent the methyl residue. These alkyl residues are halogenated and in particular both monosubstitution and disubstitution and trisubstitution by F, Cl, Br and/or I is possible. Especially preferred halogenalkyl residues are fluorinated methyl residues, for example the $F_3C$— or $ClF_2C$— residue.

The present invention provides a process for the manufacture of the compounds of Formula I, which comprises
(a) reacting an aromatic residue of formula

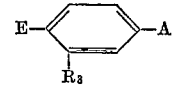

(II)

with a primary or secondary amine of formula

(IIa)

in which $R_2$ and $R_3$ have the meanings given above, E represents the HO— group or its alkali salt or the residue $R_1$—CO—X—O—, wherein $R_1$ and X have the meanings given above and A represents one of the groupings

—NH—COOR′

—NH—COHalogen

—NH—CONH$_2$ or          —N=C=O            (IIb)

R′ represents an alkyl or aryl residue which can be easily split off as the corresponding alcohol or phenol. Such residues are especially lower alkyl residues having 1 to 4 carbon atoms or the phenyl residue, (b) reacting an aniline of formula

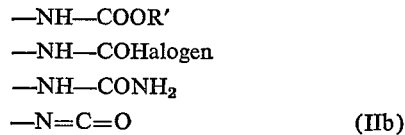

(IIc)

with a compound of formulae $CH_3(R_2)N$—COOR′

$CH_3(R_2)N$—COHalogen $CH_3(R_2)N$—CONH$_2$ or          $CH_3N$=C=O            (IId)

wherein R′, $R_2$, $R_3$ and E have the meanings given above, or (c) reacting a urea of formula

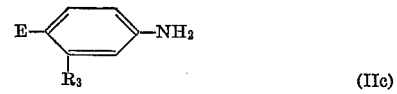

(IIe)

with a compound of formula $R_1$—CO—X—Cl            (IIf)

wherein $R_1$, $R_2$, $R_3$ and X have the meanings given above.

If in the manufacturing process (a) and (b) E represents the HO— group or its alkali salt, the group $R_1$—CO—X— can be introduced according to process (c).

The aminophenoxycarboxylic acids of formula

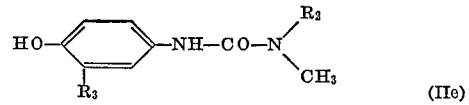

(III)

which may, where relevant, be required as intermediate products are, for example, obtained by reaction of the corresponding N-protected aminophenolate with the salt of the halogenalkanecarboxylic acid in question or with its derivative $R_1$—CO—X—Halogen, by reaction of the corresponding nitrophenolate with the salt of the halogenalkanecarboxylic acid or one of its derivatives, for example, with the alkali salt of the halogenacetic acid or α-halogenopropionic acid, and subsequent reduction of the nitro group, or by reaction of the optionally substituted nitrochlorobenzene, for example 3,4-dichloronitrobenzene, with a salt of glycollic acid or a suitable derivative and subsequent reduction of the nitro group.

It is however also possible to start from the p-aminophenol, to protect the amino group by acylation with, for example, acetic anhydride and to chlorinate with $Cl_2$ or $SO_2Cl_2$, after which the resulting intermediate product

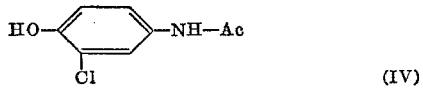

(IV)

is hydrolysed, the urea bridge is produced by means of phosgene and dimethylamine (or O,N-dimethylhydroxylamine) and thereafter one of the residues

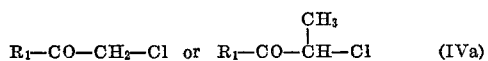

(IVa)

is allowed to react with the free hydroxyl group, with $R_1$ having the meaning given above.

It is furthermore also possible, starting from p-aminophenol, first to produce the urea grouping with the aid of phosgene and dimethylamine (or O,N-dimethylhydroxylamine) and then to obtain the intermediate product (IIe) by chlorination with, for example, $Cl_2$ or $SO_2Cl_2$.

It is, of course, also possible to convert the compound of formula

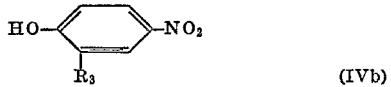

(IVb)

by hydrogenation into the compound of formula

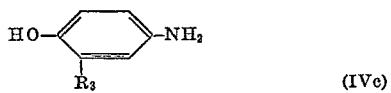

(IVc)

and then to introduce the residue $R_1$—CO—X—O— and the urea grouping according to one of the indicated methods.

The compounds according to the invention of Formula I possess a broad biocidal action and can be employed for combating the most diverse vegetable and animal pests.

The compounds especially possess a herbicidal action. This action can be total or selective. Total herbicidal action, and also a defoliating action, is observed when larger quantities are used. Such actions are always of advantage in cases where the soil to be used is to be prepared for fresh planting whilst remnants of previously planted cultures are still present. The selective herbicidal action can be achieved in the pre-emergence process and in the post-emergence process and is especially observed in important large-scale cultures such as grain, for example, wheat, oats, barley, rice and maize, sugar beet, soya, cotton, lucerne and potatoes. The amounts used can vary within wide limits, for example, within the range of from 0.1 to 10 kg. of active ingredient per hectare, but preferably 0.5 to 5 kg. per hectare. The active ingredients according to the invention, of Formula I, can also be employed for influencing plant growth, for example for accelerating ripening in the case of plants through premature drying-out, and also for increasing fruit setting, retarding flowering, extending the storage stability of harvest products or imparting frost-resistance.

The compounds of Formula I furthermore also possess a molluscicidal action, for example against gastropods; when used in very small amounts they show a microbiocidal activity against bacteria and fungi; they also however exert an action against nematodes, for example, Panagrellus redivivus and Meloidogyne sp., and also against insects and representatives of the order Acarina.

Compounds of formula

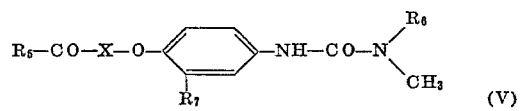

(V)

have proved especially suitable for the indicated use. In this formula X has the meaning given above, $R_5$ represents a group —$N(A_1')(A_2')$ or $R_8$—O—, in which $A_1'$ represents a hydrogen atom or a $C_1$-alkyl to $C_4$-alkyl residue, $A_2'$ represents a hydrogen atom, a $C_1$-alkyl to $C_4$-alkyl residue or a phenyl residue which can be substituted by one or more halogen atoms, especially chlorine atoms, and $R_8$ represents a hydrogen, alkali or alkaline earth metal atom, an unsubstituted ammonium residue or an ammonium residue substituted by one or more lower alkyl or lower hydroxyalkyl groups, a $C_1$-alkyl to $C_4$-alkyl residue or an unsubstituted phenyl residue or a phenyl residue substituted by one or more halogen atoms, $R_6$ represents the $CH_3$— or $CH_3O$— group and $R_7$ represents a halogen atom or the $CF_3$— group.

Amongst the group of compounds of Formula V, the compounds of formulae

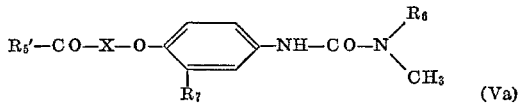

(Va)

and

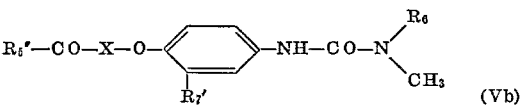

(Vb)

wherein $R_6$, $R_7$ and X have the meanings given above and $R_5'$ represents an unsubstituted ammonium residue or an ammonium residue substituted by one or two to three identical or different lower alkyl or hydroxyalkyl groups, $R_5''$ represents a symmetrical or asymmetrical $C_1$-dialkylamino to $C_4$-dialkylamino group, the HO— group or its alkali or alkaline earth metal salt or a $C_1$-alkoxy to $C_4$-alkoxy group, and $R_7'$ represents a chlorine or bromine atom or the $CF_3$— group are especially interesting.

The active substances of Formula I can be employed by themselves or together with a suitable carrier and/or other additives.

Thus, the present invention provides herbicidal or pesticidal preparations which comprise a compound of the Formula I as the active ingredient, together with a carrier and/or other additive.

Suitable carriers and additives can be solid or liquid and correspond to the substances which are customary in formulation technology, such as, for example, natural or regenerated mineral substances, solvents, diluents, dispersing agents, emulsifiers, wetting agents, adhesives, thickeners, binders or fertilisers. Furthermore, yet further biocidal compounds can be added. Such biocidal compounds can for example belong to the class of the ureas, the saturated or unsaturated halogen-fatty acids, halogenobenzonitriles, halogenobenzoic acids, phenoxyalkylcarboxylic acids, carbamates, triazines, nitroalkylphenols, organic phosphoric acid compounds, quaternary ammonium salts, sulphamic acids, arsenates, arsenites, borates or chlorates.

Such agents can be employed in the form of solutions, emulsions, suspensions, granules or dusting agents. The form used depends on the use to which the preparation is to be put and it must be ensured that the active substance can be finely distributed. The action can be intensified, especially in the case of the total destruction of plant growth, in premature drying-out and in defoliation, by the use of carrier substances which are in themselves phytotoxic, such as, for example, high-boiling mineral oil fractions or chlorinated hydrocarbons; on the other hand the selective property of the active substances, for example, in selective herbicides, manifests itself especially clearly if carrier substances, which are inert towards plants, are used.

Possible substances for the manufacture of solutions are solvents especially, for example, alcohols, for example, ethyl or isopropyl alcohol, ketones, for example, acetone or cyclohexanone, aliphatic hydrocarbons, for example, kerosene, and cyclic hydrocarbons, for example, benzene, or toluene, xylene, tetrahydronaphthalene, alkylated naphthalenes, also chlorinated hydrocarbons such as tetrachlorethane or ethylene chloride, and finally also mineral and vegetable oils or mixtures of the above-mentioned substances.

The aqueous forms of preparation are preferably emulsions and dispersions. The active substances, as such or in one of the above-mentioned solvents, are homogenised in water, preferably by means of wetting agents or dispersing agents. As cationic emulsifiers or dispersing agents, quaternary ammonium compounds may be mentioned as ex amples, as anionic agents, soaps, aliphatic long-chain sulphuric acid monoesters, aliphatic-aromatic sulphonic acids, and long-chain alkoxyacetic acids may for example be mentioned, and as non-ionic agents polyglycol ethers of fatty alcohols or ethylene oxide condensation products with p-tert. alkylphenols may for example be mentioned. On the other hand it is also possible to manufacture concentrates consisting of the active substance, emulsifier or dispersing agent and, optionally, solvents. Such concentrates can be diluted before use, for example, with water.

Dusting agents can either be manufactured by mixing or conjoint grinding of the active substance with a solid carrier, for example, talc, diatomaceous earth, kaolin, bentonite, calcium carbonate, boric acid, tricalcium phosphate, but also wood flour or cork powder, charcoal and other materials of vegetable origin, or the substances can be adsorbed on the carrier substances by means of a volatile solvent. Pulverulent preparations and pastes can be made capable of suspension in water by adding wetting agents and protective colloids and hence be made usable as spraying agents.

In many cases the use of granules for the uniform release of active substances over a prolonged period of time is of advantage. These granules can be manufactured by dissolving the active substance in an organic solvent, absorbing this solution by means of a granular mineral, for example attapulgite or $SiO_2$, and removing the solvent. They can also be manufactured by mixing the active substances of Formula I with polymerisable compounds, after which a polymerisation is carried out which leaves the active substances unaffected, with the granulation being carried out whilst the polymerisation is still proceeding. The content of active substance in the agents described above is within the range of from 0.1 and 95%, and it should here be mentioned that on application from an aircraft or by means of other suitable application instruments, concentrations of up to 99.5% or even pure active substance are employed.

The following examples illustrate the invention. The parts denote parts by weight.

EXAMPLE 1

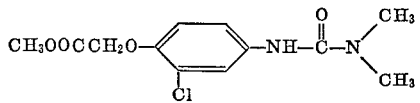

[Compound No. 1]

121 parts of 2-chlor-4-isocyanatophenoxyacetic acid methyl ester are dissolved in 200 parts by volume of anhydrous toluene and 500 parts by volume of ether. 25 parts of gaseous dimethylamine are introduced into this solution during ½ an hour at between —10 and —5° C. whilst stirring, and after one hour the mixture is diluted with 500 parts by volume of petroleum ether (boiling point 50 to 70° C.), cooled and filtered, and the product recrystallised from acetonitrile. Melting point: 105 to 107° C.

EXAMPLE 2

(a) 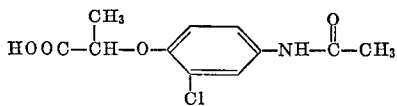

144 parts of 2-chlor-4-aminophenol are warmed for 3 hours on a waterbath with 130 parts by volume of water, 100 parts by volume of glacial acetic acid and 110 parts by volume of acetic anhydride and poured into 1000 parts by volume of ice water. The 2-chlor-4-acetaminophenol which has separated out (melting point: 141 to 143° C.) is filtered off.

The 2-chlor-4-acetaminophenol is dissolved in 37 parts of sodium hydroxide and 300 parts by volume of water in a four-neck flask provided with a stirrer, thermometer and two dropping funnels, and warmed to 100° C. 130 parts of α-chloropropionic acid and 30% strength aqueous sodium hydroxide solution are simultaneously added dropwise during 2 hours whilst stirring, the sodium hydroxide solution being added at such a speed that the pH-value remains between 11 and 12. Thereafter the mixture is further warmed to 110° C. for 4 hours and is then mixed with 300 parts by volume of ice water, acidified with concentrated hydrochloric acid, cooled and filtered. Melting point: 161 to 163° C.

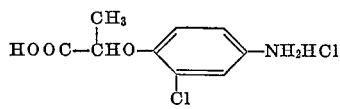

(b)

206 parts of α(2-chlor-4-acetamino-phenoxy)-propionic acid together with 400 parts by volume of concentrated hydrochloric acid and 200 parts by volume of water are heated for 15 hours under reflux; thereafter the water is removed in a rotational evaporator. Melting point: 187 to 190° C. (decomposition).

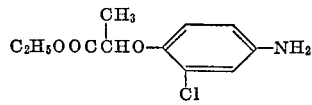

(c)

190 parts of α(2-chlor-4-amino-phenoxy)-propionic acid hydrochloride are suspended, in 1000 parts by volume of absolute ethanol, after which dry HCl gas is passed in until the mixture is saturated, in the course of which the temperature rises up to 70° C. if the gas is passed in rapidly. After 24 hours the ethanol is evaporated, and the whole is poured into 200 parts by volume of water and rendered alkaline with sodium carbonate, whereupon a dark-coloured oil separates out which is taken up in ether. After drying over sodium sulphate, the ether is removed in a rotational evaporator.

(d) 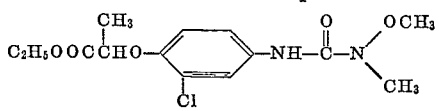

100 parts of phosgene are introduced into 300 parts by volume of ethyl acetate in a sulphonation flask equipped with a dropping funnel, reflux condenser, thermometer, gas inlet tube and stirrer, at —5° C. and with vigorous stirring. 165 parts of α(2-chlor-4-amino-phenoxy)-propionic acid ethyl ester in 300 parts by volume of ethyl acetate are then added dropwise during 1 hour at between —5 and +5° C., and the mixture is slowly heated to boiling under reflux during 5 hours. Thereafter the ethyl acetate and the excess phosgene are distilled off (under reduced pressure towards the end). The α(2-chlor-4-isocyanato-phenoxy)-propionic acid ethyl ester which remains is dissolved in 400 parts by volume of anhydrous toluene and mixed with 43 parts of O,N-dimethylhydroxylamine in 50 parts by volume of ethyl acetate whilst stirring. After one hour the mixture is diluted with 300 parts by volume of petroleum ether (50 to 70° C.), cooled and filtered, and the product recrystallised from toluene/petroleum ether (boiling point 50 to 70° C.). Melting point: 53 to 56° C. [Compound No. 2].

EXAMPLE 3

(a) 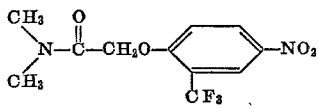

113 parts of 2-chloro-5-nitro-benzotrifluoride and 87.5 parts of the sodium salt of glycollic acid dimethylamide in 400 parts by volume of methyl ethyl ketone are heated for 8 hours under reflux. Thereafter the methyl ethyl ketone is largely evaporated off in vacuo, and the residue is poured into ice water, filtered and recrystallised from ethanol. Melting point: 118 to 120° C.

(b) 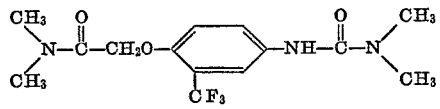

116 parts of 2-trifluoromethyl-4-nitro-phenoxy-acetic acid dimethylamide in 400 parts by volume of methanol are heated at 40° C., in a duck-shaped shaking vessel, with the calculated amount of hydrogen, using Raney nickel; the Raney nickel is then filtered off and rinsed with methanol. The combined extracts are freed of methanol in a rotational evaporator.

The 2-trifluoromethyl-4-amino-phenoxyacetic acid dimethylamide which remains is phosgenated as described under 2(d), using 70 parts of phosgene in 500 parts by volume of ethyl acetate, to give the 2-trifluoromethyl-4-isocyanato-phenoxyacetic acid dimethylamide.

96 parts of 2-trifluoromethyl-4-isocyanato-phenoxy-acetic acid dimethylamide are dissolved in 500 parts by volume of ether and 22 parts of gaseous dimethylamine are passed into the solution at between −5 and 0° C. After two hours the mixture is diluted with 300 parts by volume of petroleum ether (50 to 70° C.) and then cooled and filtered, and the product is recrystallised from acetonitrile. Melting point: 132 to 134° C. (Compound No. 3).

The following compounds can be manufactured analogously:

(4) 2-chloro-4-(N,N-dimethylcarbamoylamino) - phenoxyacetamide.

(5) 2-chloro-4-(N,N-dimethylcarbamoylamino)-phenoxyacetic acid diethylamide.
(6) 2-trifluoromethyl-4-(N,N-dimethylcarbamoylamino)-phenoxyacetic acid methyl ester.
(7) 2-chloro-4-(N-methyl-N - methoxycarbamoylamino)-phenoxyacetic acid butyl ester.
(8) 2-chloro-4-(N-methyl-N - methoxycarbamoylamino)-phenoxyacetic acid triethanolamine salt.
(9) 2-chloro-4-(N-methyl-N - methoxycarbamoylamino)-phenoxyacetic acid trimethylammonium salt.
(10) 2-trifluoromethyl-4-(N-methyl-N - methoxycarbamoylamino)-phenoxy-α - propionic acid 3′,4′ - dichlorophenyl ester.

I claim:
1. A compound of the formula

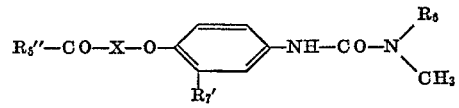

wherein $R_5''$ is alkoxy of from 1 to 4 carbon atoms or 3′, 4′-dichlorophenoxy; $R_6$ is methyl or methoxy; $R_7'$ is chlorine or trifluoromethyl; and X is —CH$_2$— or

—CH(CH$_3$)—

2. A compound according to claim 1 which is 2-chloro-4-(N,N - dimethylcarbamoylamino) - phenoxyacetic acid methyl ester.
3. A compound according to claim 1 which is 2-chloro-4-(N-methyl-N-methoxycarbamoylamino) - phenoxy - α-propionic acid ethyl ester.
4. A compound according to claim 1 which is 2-trifluoromethyl-4-(N,N - dimethylcarbamoylamino) - phenoxyacetic acid methyl ester.
5. A compound according to claim 1 which is 2-chloro-4-(N-methyl-N-methoxycarbamoylamino) - phenoxyacetic acid butyl ester.

References Cited
UNITED STATES PATENTS
3,515,749   6/1970   Fried et al. _____ 260—471 R LORRAINE A. WEINBERGER, Primary Examiner L. A. THAXTON, Assistant Examiner U.S. Cl. X.R.
71—111, 116, 120; 260—501.11, 519, 553, 999